United States Patent
Tzeng et al.

(12)

(10) Patent No.: US 11,592,930 B1
(45) Date of Patent: Feb. 28, 2023

(54) TOUCHPAD ASSEMBLY FOR AN INFORMATION HANDLING SYSTEM

(71) Applicant: Dell Products L.P., Round Rock, TX (US)

(72) Inventors: Chun-Kai Tzeng, KeeLung (TW); Chih-Ping Chang, Taipei (TW); Shih-Chang Hu, New Taipei (TW); Chin-Chung Wu, Yonghe Dist (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/658,109

(22) Filed: Apr. 6, 2022

(51) Int. Cl.
  *G06F 3/041* (2006.01)
  *G06F 3/01* (2006.01)
  *G06F 1/16* (2006.01)

(52) U.S. Cl.
  CPC .......... *G06F 3/04164* (2019.05); *G06F 3/016* (2013.01); *G06F 1/169* (2013.01)

(58) Field of Classification Search
  None
  See application file for complete search history.

(56) References Cited

U.S. PATENT DOCUMENTS

| | | | |
|---|---|---|---|
| 2011/0141052 A1* | 6/2011 | Bernstein | G06F 3/041 341/5 |
| 2012/0040721 A1* | 2/2012 | Infanti | G06F 3/016 345/173 |
| 2016/0162030 A1* | 6/2016 | Patel | G06F 1/169 345/173 |

* cited by examiner

*Primary Examiner* — Krishna P Neupane
(74) *Attorney, Agent, or Firm* — McDermott Will & Emery LLP

(57) ABSTRACT

A touchpad assembly, including an actuator device that provides motion in a first direction; a first structural element coupled to the actuator device; a second structural element coupled to the first structural element; wherein the first structural element, in response to the motion in the first direction provided by the actuator device, exerts a first rotational force in a first rotational direction, wherein the second structural element, in response to the first rotational force by the first structural element, exerts a second rotational force in a second rotational direction opposite to the first rotational direction, wherein the first rotational force and the second rotational force provide a rotational vibration of the touchpad assembly.

20 Claims, 9 Drawing Sheets

TOUCHPAD ASSEMBLY FOR AN
INFORMATION HANDLING SYSTEM

BACKGROUND

Field of the Disclosure

The disclosure relates generally to an information handling system, and in particular, a touchpad assembly for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a touchpad assembly, including an actuator device that provides motion in a first direction; a first structural element coupled to the actuator device; a second structural element coupled to the first structural element; wherein the first structural element, in response to the motion in the first direction provided by the actuator device, exerts a first rotational force in a first rotational direction, wherein the second structural element, in response to the first rotational force by the first structural element, exerts a second rotational force in a second rotational direction opposite to the first rotational direction, wherein the first rotational force and the second rotational force provide a rotational vibration of the touchpad assembly.

Other embodiments of these aspects include corresponding systems and apparatus.

These and other embodiments may each optionally include one or more of the following features. For instance, the actuator device provides motion in a second direction opposite to the first direction, wherein the first structural element, in response to the motion in the second direction provided by the actuator device, exerts a third rotational force in the second rotational direction, wherein the second structural element, in response to the third rotational force by the first structural element, exerts a fourth rotational force in the first rotational direction. The first rotational force, the second rotational force, the third rotational force, and the fourth rotational force provide the rotational vibration of the touchpad assembly. The first structural element includes a body structure; a first extension member protruding from the body structure defining a first gap between the first extension member and the body structure; and a second extension member protruding from the body structure defining a second gap between the second extension member and the body structure. The second structural element includes a perimeter structure; a first extension member protruding from the perimeter structure and positioned within the first gap; a second extension member protruding from the perimeter structure and positioned within the second gap. An end of the first extension member of the second structural element is coupled to the first structural element at a first connecting portion between the body structure and the first extension member of the first structural element, and wherein an end of the second extension member of the second structural element is coupled to the first structural at a second connecting portion between the body structure and the second extension member of the first structural element. The actuator is coupled to the first structural element outside of an inner perimeter surface of the perimeter structure of the second structural element. The actuator device is a linear resonant actuator. The actuator device is a piezo actuator. The first structural element is positioned between the second structural element and a printed circuit board (PCB). Dampening material positioned between the first structural element and the second structural element.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
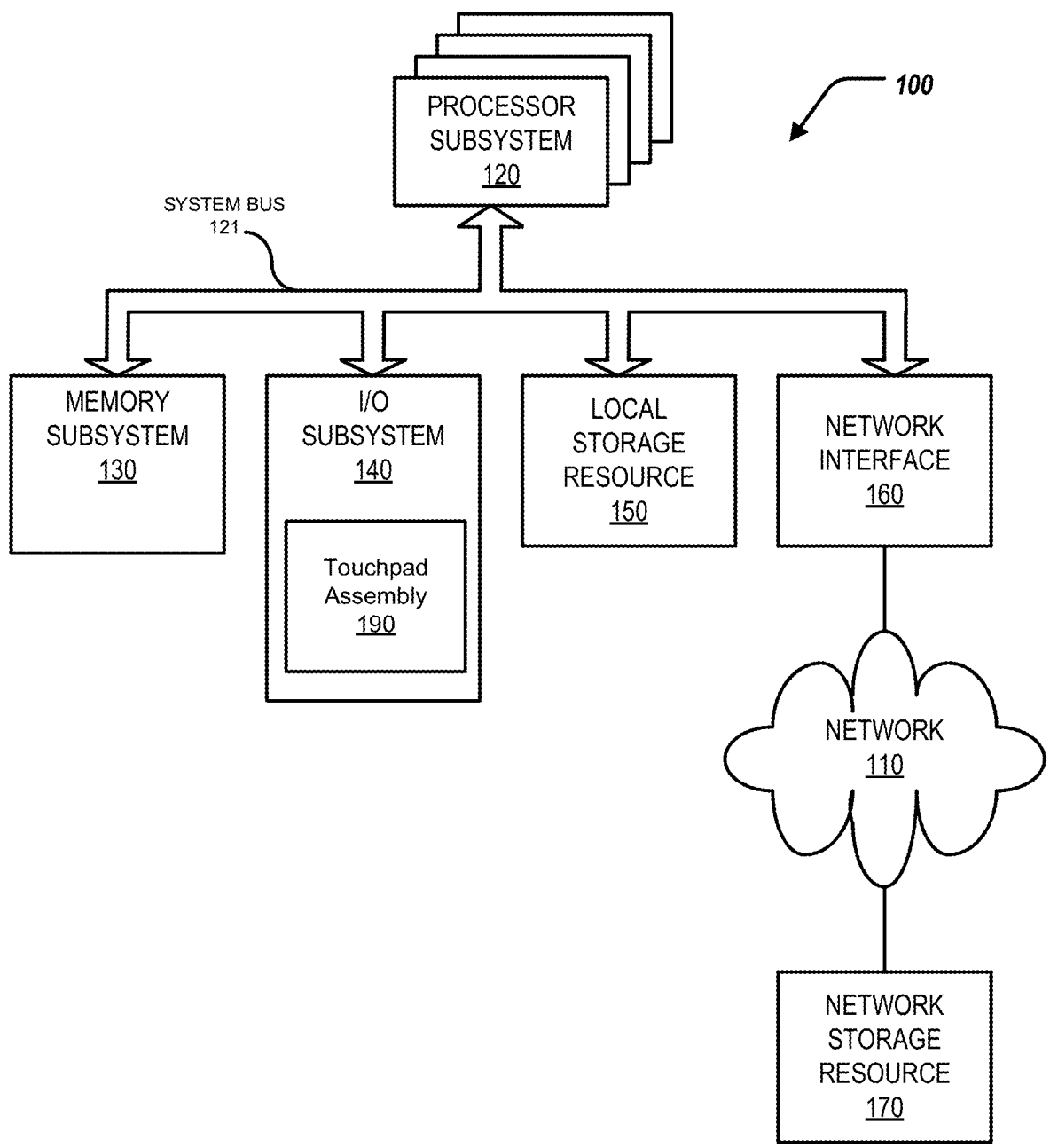
FIG. 1 is a block diagram of selected elements of an embodiment of an information handling system.

This disclosure discusses a touchpad assembly of an information handling system. In short, a touchpad assembly can provide a vibration adjustable haptic mechanism for the information handling system to provide a stable rotational vibration. An actuator of the touchpad assembly can be positioned outside of the touchpad projection area to provide magnifying intensity effect and also reduce an overall stack height of the touchpad module.

Specifically, this disclosure discusses a touchpad assembly, including an actuator device that provides motion in a first direction; a first structural element coupled to the actuator device; a second structural element coupled to the first structural element; wherein the first structural element, in response to the motion in the first direction provided by the actuator device, exerts a first rotational force in a first rotational direction, wherein the second structural element, in response to the first rotational force by the first structural element, exerts a second rotational force in a second rotational direction opposite to the first rotational direction.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-9 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, the I/O subsystem 140 can include a touchpad assembly 190.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, the touchpad assembly 190 can provide a vibration adjustable haptic mechanism for the information handling system 100 to provide a stable rotational vibration. An actuator of the touchpad assembly 190 can be positioned outside of the touchpad projection area to provide magnifying intensity effect and also reduce an overall stack height of the touchpad module 190.

Figure 2:
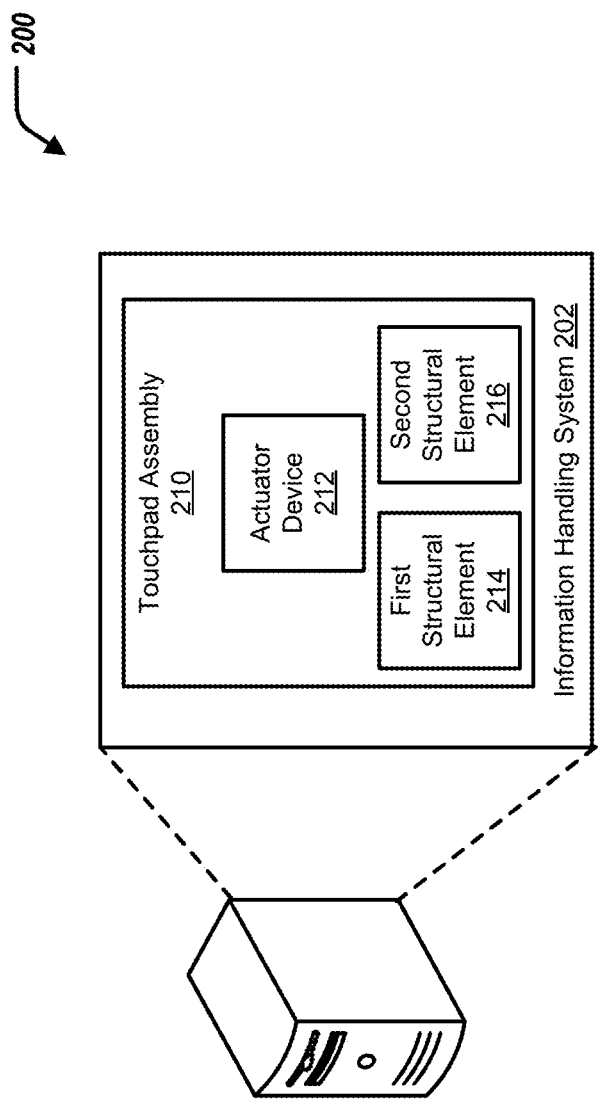
FIG. 2 illustrates a block diagram of an information handling system, including a touchpad assembly, in a first implementation.

Turning to FIG. 2, FIG. 2 illustrates an environment 200 including an information handling system 202. The information handling system 202 can include a touchpad assembly 210. In some examples, the information handling system 202 is similar to, or includes, the information handling system 100 of FIG. 1. In some examples, the touchpad assembly 210 is the same, or substantially the same, as the touchpad assembly 190 of FIG. 1.

The touchpad assembly 210 can include an actuator device 212, a first structural element 214, and a second structural element 216.

Figure 3:
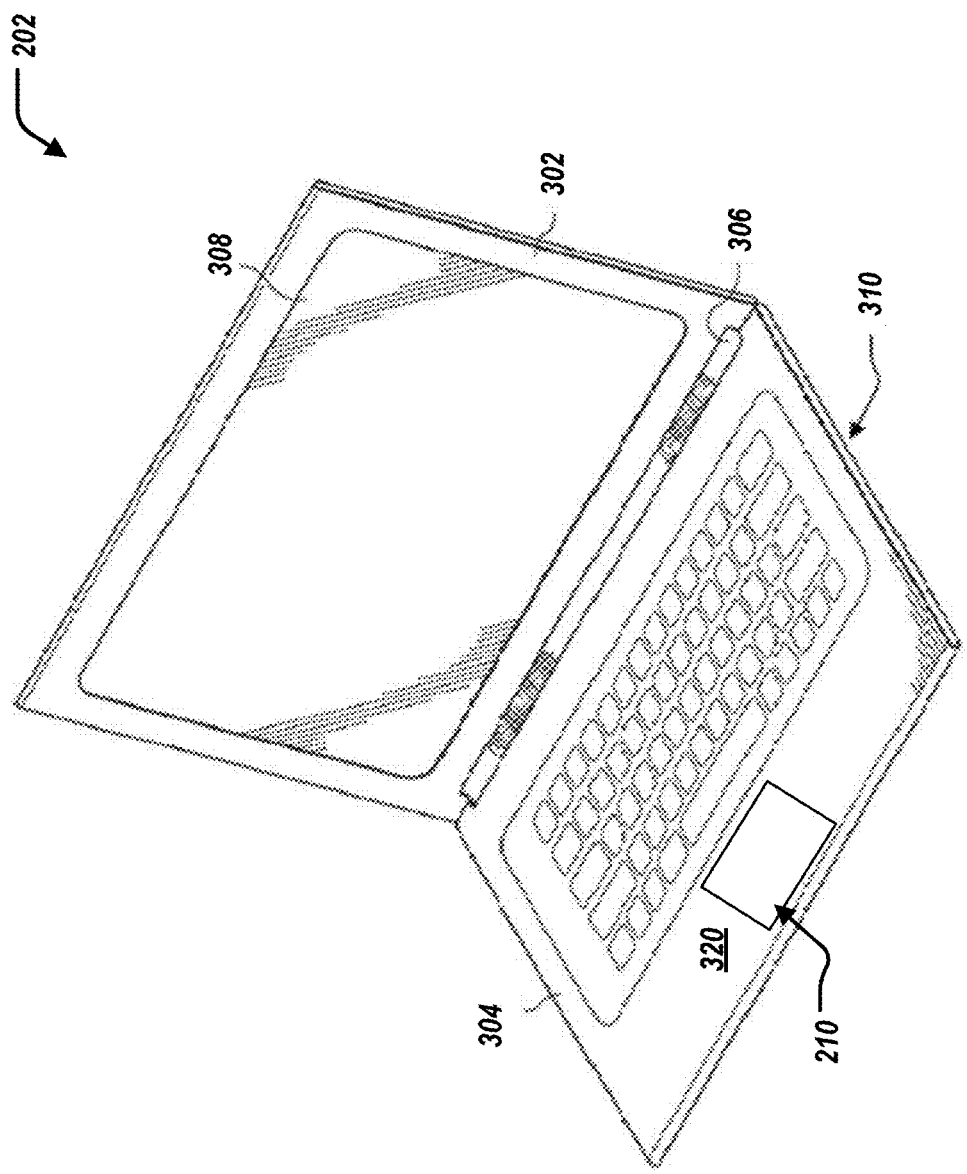
FIG. 3 is a perspective view of the information handling system.

FIG. 3 illustrates a perspective view of the information handling system 202. The information handling system 202 can include a first body 302 and a second body 304 coupled together by a hinge 306. The first body 302 can include a display 308. The second body 304 can include a keyboard 310, and other computing elements. The second body 304 can further include the touchpad assembly 210. A palm rest area 320 can surround the touchpad assembly 210.

In some examples, the touchpad assembly 210 is a "windows" type touchpad assembly 210—the touchpad assembly 210 is not connected to the palm rest area 320. In some examples, the touchpad assembly 210 is a "seamless" type touchpad assembly 210—the touchpad assembly 210 is connected to the palm rest area 320 directly.

The touchpad assembly 210 can provide haptic feedback, e.g., to a user engaged with the information handling system 202. The touchpad assembly 210 can provide haptic feedback in response to input provided by the user, e.g., the user engaging with the touchpad assembly 210 via user-touch. The touchpad assembly 210 can provide haptic feedback in response to a signal from the information handling system 202, e.g., based on operations being performed by computing elements of the information handling system 202.

Figure 4:
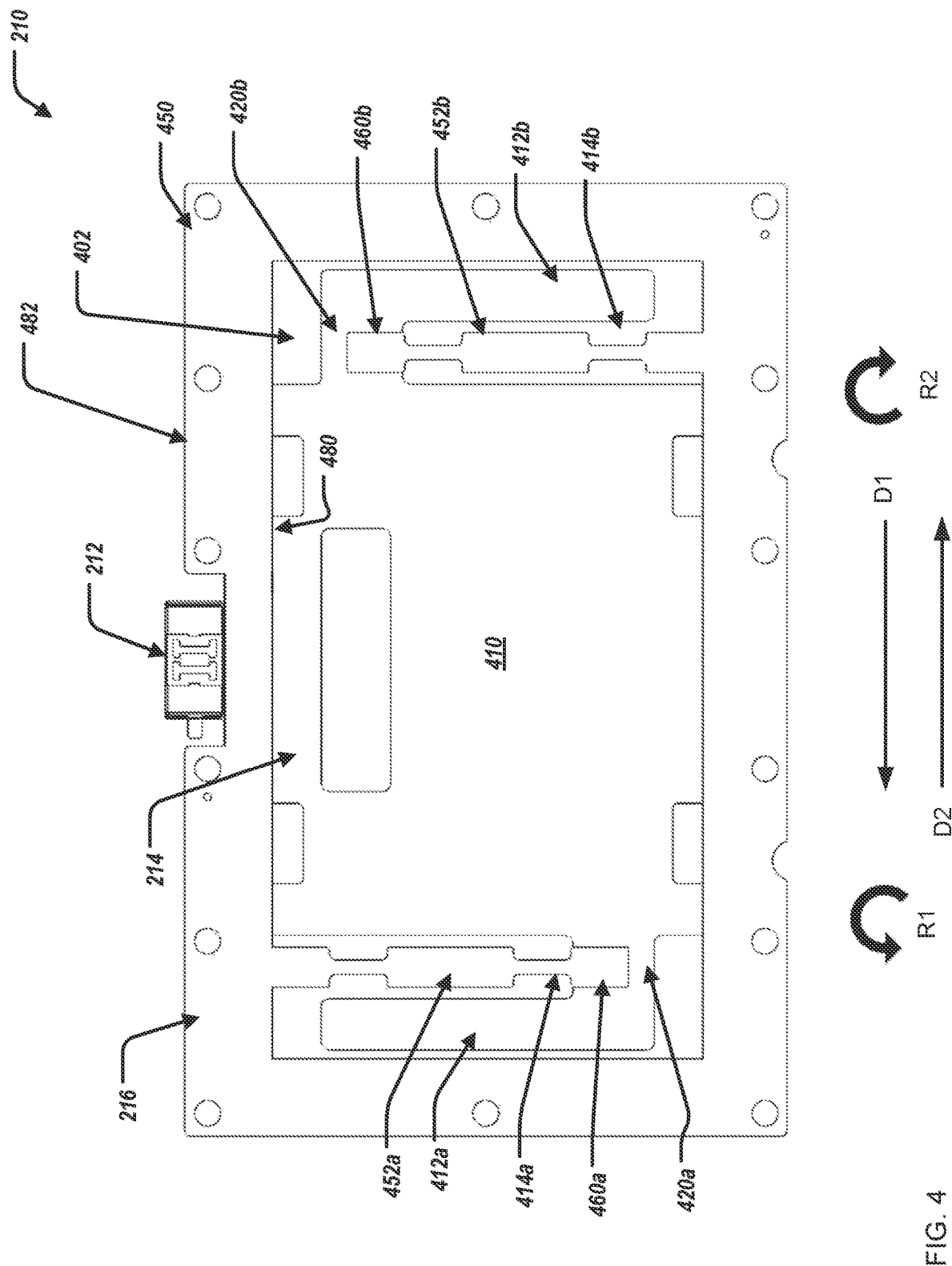
FIG. 4 illustrates a top down view of the touch pad assembly, in the first implementation.
Figure 5:
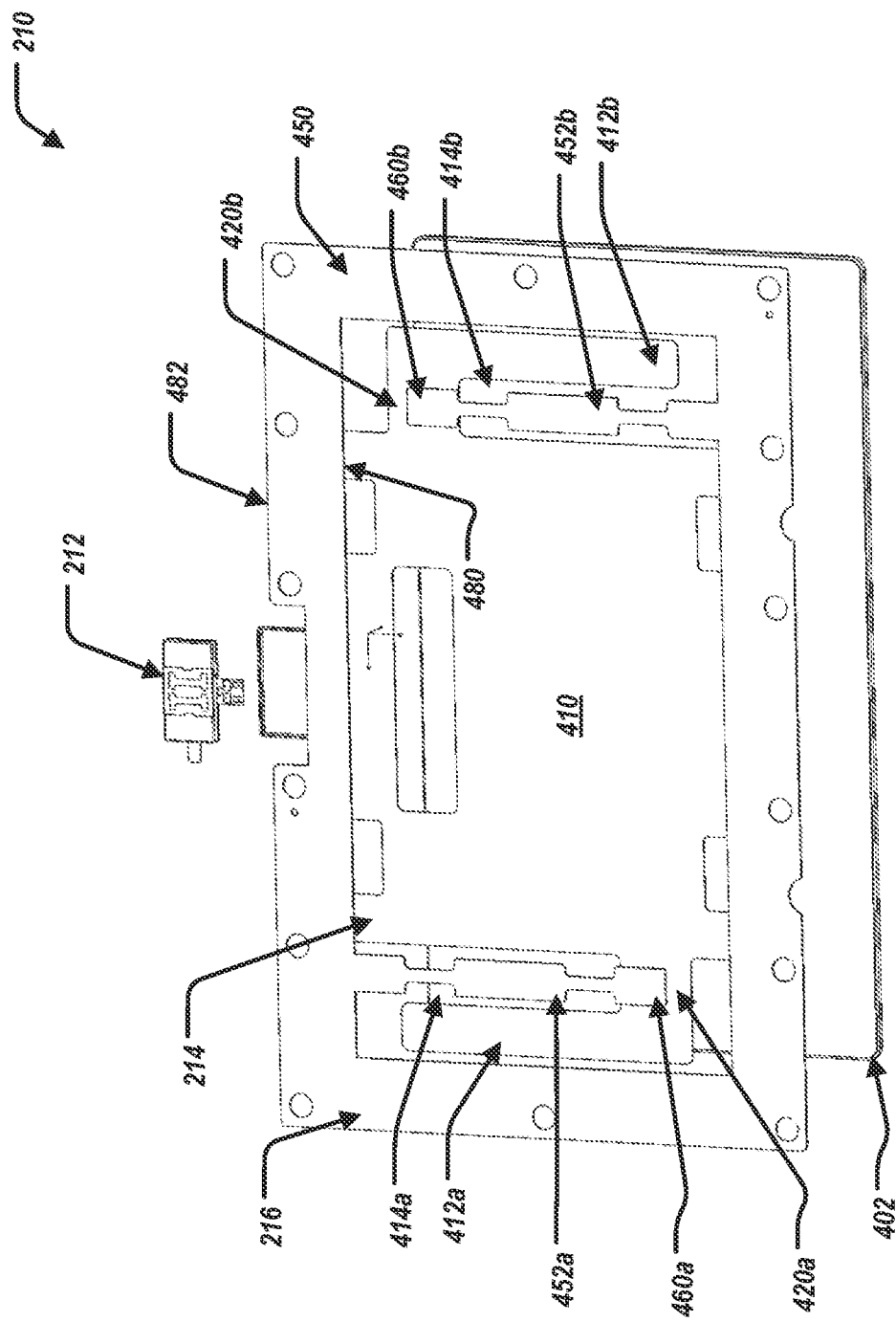
FIG. 5 illustrates an exploded view of the touch pad assembly, in the first implementation.

FIG. 4 illustrates a top down view of the touchpad assembly 210, in a first implementation; and FIG. 5 illustrates an exploded view of the touchpad assembly 210, in the first implementation. Specifically, the touchpad assembly 210 is shown including the actuator device 212, the first structural element 214, and the second structural element 216. The first structural element 214 can be positioned between the second structural element 216 and a printed circuit board (PCB) 402.

In some examples, the actuator device 212 is a linear resonant actuator (LRA). In some examples, the actuator device 212 is a piezo actuator.

In some examples, the first structural element 214 is coupled to the actuator device 212 (the actuator device 212 is coupled to the first structural element 214). For example, the actuator device 212 can be coupled to the first structural element 214 with an adhesive. In some examples, the first structural element 214 is a Tai-Chi beam design. The first structural element 214 can include a body structure 410. The first structural element 214 can include a first extension member 412a protruding from the body structure 410. A gap 414a is defined between the first extension member 412a and the body structure 410. The second structural element 216 can include a second extension member 412b protruding from the body structure 410. A gap 414b is defined between the second extension member 412b and the body structure 410. A first connecting portion 420a can connect the body structure 410 and the first extension member 412a of the first structural element 214. A second connecting portion 420b can connect the body structure 410 and the second extension member 412b of the first structural element 214.

In some examples, the second structural element 216 is coupled to the first structural element 214. For example, the second structural element 216 can be welded to the first structural element 214. In some examples, the second structural element 216 is a Tai-Chi beam design. The second structural element 216 can include a perimeter structure 450. The second structural element 216 can include a first extension member 452a protruding from the perimeter structure 450 and positioned within the gap 414a. The second structural element 216 can include a second extension member 452b protruding from the perimeter structure 450 and positioned within the gap 414b.

In some examples, an end 460a of the first extension member 452a of the second structural element 216 is coupled to the first structural element 214 at the first connecting portion 420a of the first structural element 214.

In some examples, an end 460b of the second extension member 452b of the second structural element 216 is coupled to the first structural element 214 at the second connecting portion 420b of the first structural element 214.

The perimeter structure 450 of the second structural element 216 can include an inner perimeter surface 480 and an outer perimeter surface 482 spaced-apart from the inner perimeter surface 480. In some examples, the actuator 212 is coupled to the first structural element 214 outside of the inner perimeter 480 of the perimeter structure 450 of the second structural element 216. In some examples, the actuator 212 is coupled to the first structural element 214 outside of the outer perimeter surface 482 of the perimeter structure 450 of the second structural element 216.

To that end, the actuator device 212 provides motion to the touchpad assembly 210 in a first direction D1. That is, the actuator device 212 can provide motion along the first direction D1 to the touchpad assembly 210. The first structural element 214, in response to the motion in the first direction D1 provided by the actuator device 212, exerts a first rotational force in a first rotational direction R1. In some examples, the first rotational direction R1 is a counter clockwise direction.

Specifically, the first extension member 412a and the second extension member 412b, in response to the motion provided by the actuator device 212 in the first direction D1, impart first rotational force in the first rotational direction R1 to the touchpad assembly 210. That is, a moment arm is created/defined between the actuator device 212 and the touchpad assembly 210, and in particular, between the actuator device 212 and a rotationally center point of the body structure 410 of the first structural element 214. To that end, when the actuator device 212 provides the motion to the touchpad assembly 210 along the first direction D1, such motion is translated by a lever effect of the moment arm between the actuator device 212 and the first structural element 214 to the first rotational force in the first rotational direction R1 of the first structural element 214.

Furthermore, the second structural element 216, in response to the first rotational force in the first rotational direction R1 provided by the first structural element 214, exerts a second rotational force in a second rotation direction R2. In some examples, the second rotational direction R2 is opposite to the first rotational direction R1. In some examples, the second rotational direction R2 is in a clockwise direction. Specifically, the first extension member 452a and the second extension member 452b, in response to the first rotational force provided by the first structural element 214 in the first rotational direction R1, imparts second rotational force in the second rotational direction R2 to the touchpad assembly 210.

In some examples, the actuator device 212 provides motion in a second direction D2 to the touchpad assembly 210. That is, the actuator device 212 can provide motion along the second direction D2 to the touchpad assembly 210. The first structural element 214, in response to the motion in the second direction D2 provided by the actuator device 212, exerts a third rotational force in the second rotational direction R2. Specifically, the first extension member 412a and the second extension member 412b, in response to the motion provided by the actuator device 212 in the second direction D2, impart a third rotational force in the second rotational direction R2 to the touchpad assembly 210.

Furthermore, the second structural element 216, in response to the third rotational force in the second rotational direction R2 provided by the first structural element 214, exerts a fourth rotational force in the first rotational direction R1. Specifically, the first extension member 452a and the second extension member 452b, in response to the third rotational force provided by the first structural element 214 in the second rotational direction R2, imparts a fourth rotational force in the first rotational direction R1 to the touchpad assembly 210.

In some examples, the touchpad assembly 210 can include a dampening material positioned between the first structural element 214 and the second structural element 216. The dampening material can allow adjustment of the spring stiffness and the dampening ratio of the touchpad assembly 210. For example, the quantity of dampening material can be increased (or decreased) to increase (or decrease) the dampening ratio between the first structural element 214 and the second structural element 216 (for expected vibration behavior).

The combination of at least the first rotational force, the second rotational force, the third rotational force, and the fourth rotational force can provide haptic feedback by the touchpad assembly 210, and in particular, a (stable) rotational vibration of the touchpad assembly 210.

Figure 6:
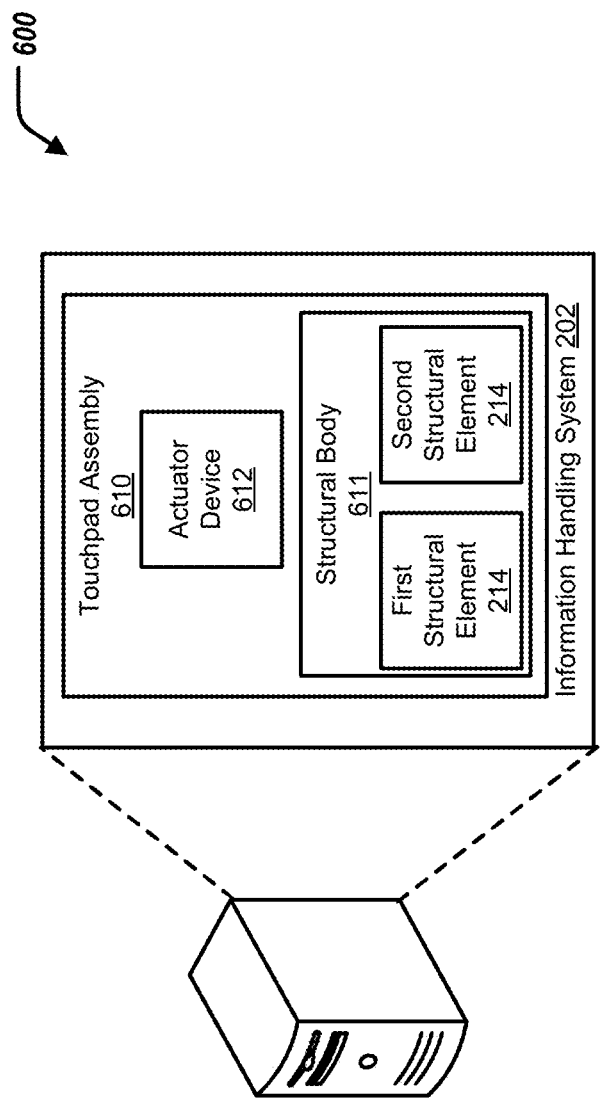
FIG. 6 illustrates a block diagram of an information handling system, including a touchpad assembly, in a second implementation.

Turning to FIG. 6, FIG. 6 illustrates an environment 600 including an information handling system 602. The information handling system 602 can include a touchpad assembly 610. In some examples, the information handling system 602 is similar to, or includes, the information handling system 100 of FIG. 1. In some examples, the touchpad assembly 610 is the same, or substantially the same, as the touchpad assembly 190 of FIG. 1.

The touchpad assembly 610 can include a structural body 611 and an actuator device 612. The structural body 611 can include a first structural element 614, and a second structural element 616.

Figure 7:
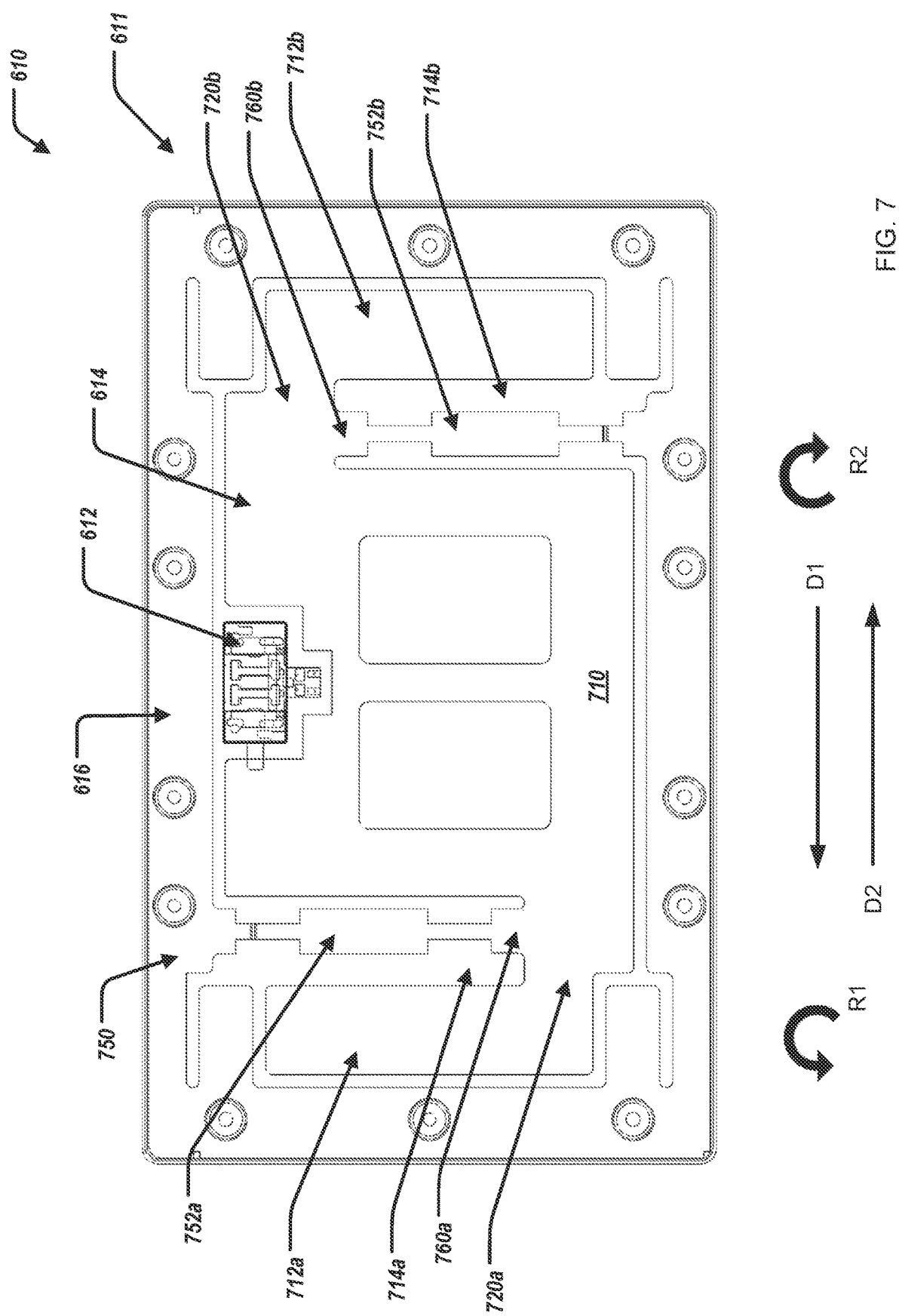
FIG. 7 illustrates a top down view of the touch pad assembly, in the second implementation.
Figure 8:
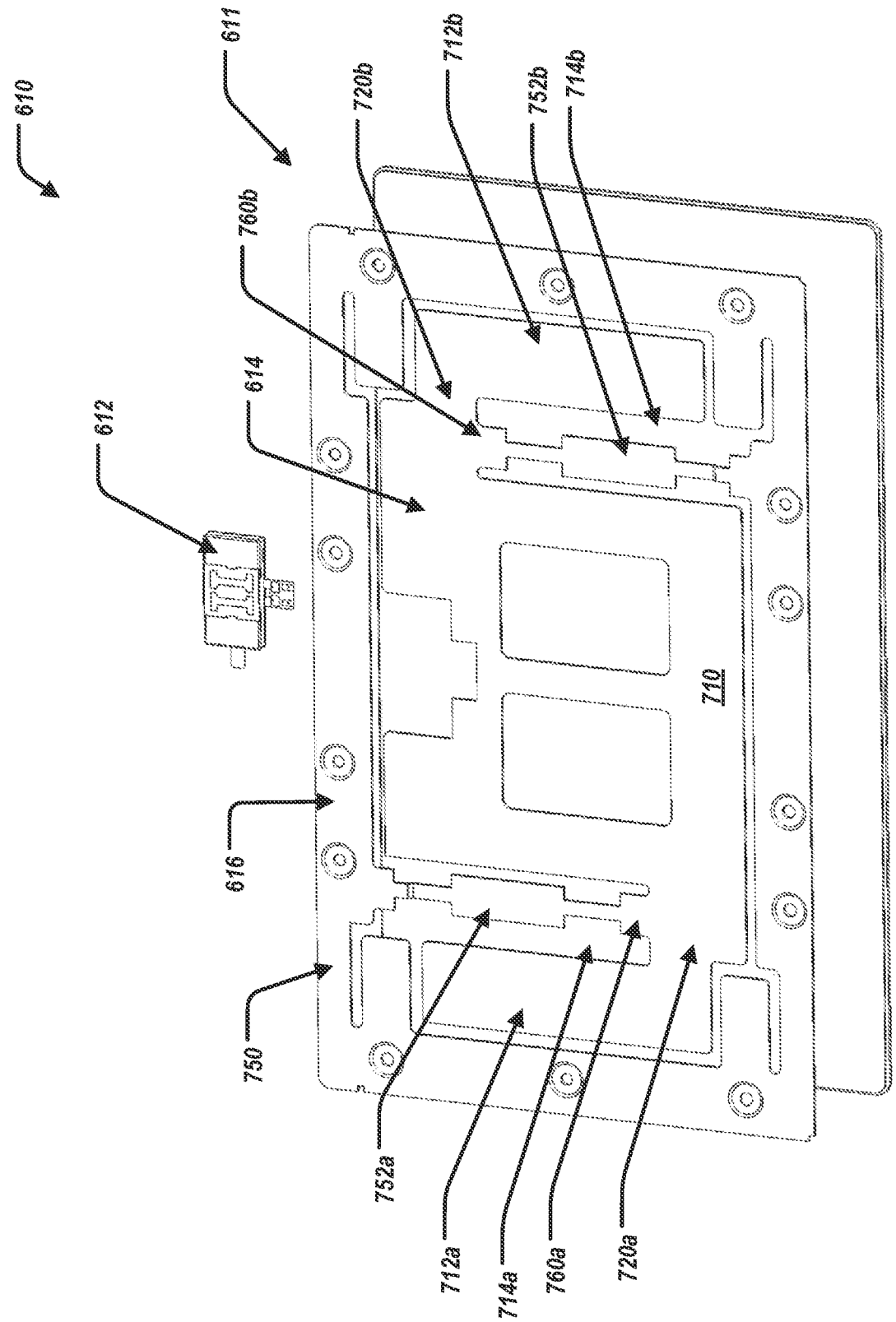
FIG. 8 illustrates an exploded view of the touch pad assembly, in the second implementation.

FIG. 7 illustrates a top down view of the touchpad assembly 610, in a second implementation; and FIG. 8 illustrates an exploded view of the touchpad assembly 610, in the second implementation. Specifically, the touchpad assembly 610 is shown including the actuator device 612, and the structural body 611.

In some examples, the actuator device 612 is a linear resonant actuator (LRA). In some examples, the actuator device 612 is a piezo actuator.

In some examples, the first structural element 614 is coupled to the actuator device 612 (the actuator device 612 is coupled to the first structural element 614). For example, the actuator device 612 can be coupled to the first structural element 614 with an adhesive. In some examples, the first structural element 614 is a Tai-Chi beam design. The first structural element 614 can include a body structure 710. The first structural element 614 can include a first extension member 712a protruding from the body structure 710. A gap 714a is defined between the first extension member 712a and the body structure 710. The first structural element 614 can include a second extension member 712b protruding from the body structure 710. A gap 714b is defined between the second extension member 712b and the body structure 710. A first connecting portion 720a can connect the body structure 710 and the first extension member 712a of the first structural element 614. A second connecting portion 720b can connect the body structure 710 and the second extension member 712b of the first structural element 614.

The second structural element 616 is connected (or coupled) to the first structural element 614. In some examples, the second structural element 616 is a Tai-Chi beam design. The second structural element 616 can include a perimeter structure 750. The second structural element 616 can include a first extension member 752a protruding from the perimeter structure 750 and positioned within the gap 714a. The second structural element 616 can include a second extension member 752b protruding from the perimeter structure 750 and positioned within the gap 714b.

In some examples, an end 760a of the first extension member 752a of the second structural element 616 is coupled to the first structural element 614 at the first connecting portion 720a of the first structural element 614.

In some examples, an end 760b of the second extension member 752b of the second structural element 616 is coupled to the first structural element 614 at the second connecting portion 720b of the first structural element 614.

In some examples, the actuator 612 is coupled to the first structural element 614 between the perimeter structure 750 of the second structural element 616 and the body structure 710 of the first structural element 614.

To that end, the actuator device 612 provides motion in a first direction D1. That is, the actuator device 612 can provide motion along the first direction D1 to the touchpad assembly 610. The first structural element 614, in response to the motion in the first direction D1 provided by the actuator device 612, exerts a first rotational force in a first rotational direction R1. In some examples, the first rotational direction R1 is a counter clockwise direction.

Specifically, the first extension member 712a and the second extension member 712b, in response to the motion provided by the actuator device 612 in the first direction, impart first rotational force in the first rotational direction R1 to the touchpad assembly 610. That is, a moment arm is created/defined between the actuator device 612 and the touchpad assembly 610, and in particular, between the actuator device 612 and a rotationally center point of the body structure 710 of the first structural element 614. To that end, when the actuator device 612 provides the motion to the touchpad assembly 610 along the first direction D1, such motion is translated by a lever effect of the moment arm between the actuator device 612 and the first structural element 614 to the first rotational force in the first rotational direction R1 of the first structural element 614.

Furthermore, the second structural element 616, in response to the first rotational force in the first rotational direction R1 provided by the first structural element 614, exerts a second rotational force in a second rotational direction R2. In some examples, the second rotational direction R2 is opposite to the first rotational direction R1. In some examples, the second rotational direction R2 is in a clockwise direction. Specifically, the first extension member 752a and the second extension member 752b, in response to the first rotational force provided by the first structural element 614 in the first rotational direction R1, imparts second rotational force in the second rotational direction R2 to the touchpad assembly 610.

In some examples, the actuator device 612 provides motion in a second direction D2. That is, the actuator device 612 can provide motion along the second direction D2 to the touchpad assembly 610. The first structural element 614, in response to the motion in the second direction D2 provided by the actuator device 612, exerts a third rotational force in the second rotational direction R2. Specifically, the first extension member 712a and the second extension member 712b, in response to the motion provided by the actuator device 612 in the first direction, impart a third rotational force in the second rotational direction R2 to the touchpad assembly 610.

Furthermore, the second structural element 616, in response to the third rotational force in the second rotational direction R2 provided by the first structural element 614, exerts a fourth rotational force in the first rotational direction R1. Specifically, the first extension member 752a and the second extension member 752b, in response to the third rotational force provided by the first structural element 614 in the second rotational direction R2, imparts a fourth rotational force in the first rotational direction R1 to the touchpad assembly 610.

The combination of at least the first rotational force, the second rotational force, the third rotational force, and the fourth rotational force can provide haptic feedback by the touchpad assembly 610, and in particular, a (stable) rotational vibration of the touchpad assembly 610.

Figure 9:
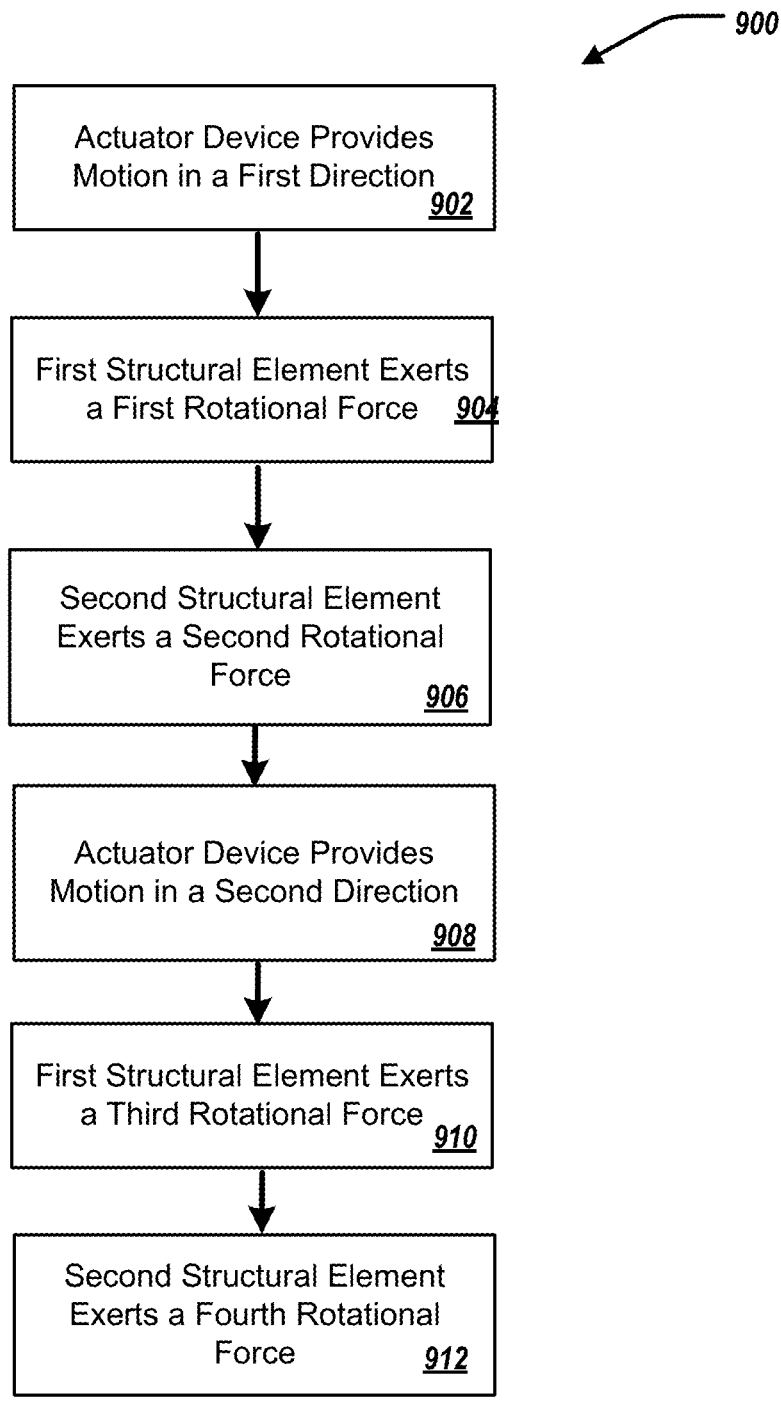
FIG. 9 illustrates a method for providing haptic feedback with the touchpad assembly.

FIG. 9 illustrates a flowchart depicting selected elements of an embodiment of a method 900 for providing haptic feedback. The method 900 may be performed by the information handling system 100, the information handling system 202, the touchpad 210, and/or the touchpad 610, and with reference to FIGS. 1-8. It is noted that certain operations described in method 900 may be optional or may be rearranged in different embodiments.

The actuator (210, 610) provides motion in the first direction D1 (902). The first structural element (214, 614) exerts a first rotational force in the first rotational direction R1 in response to the motion provided by the actuator in the first direction D1 (904). The second structural element (216, 616) exerts a second rotational force in the second rotational direction R2 in response to the first rotational force provided by the first structural element in the first rotational direction R1 (906). The actuator (210, 610) provides motion in the second direction D2 (908). The first structural element (214, 614) exerts a third rotational force in the second rotational direction R2 in response to the motion provided by the actuator in the second direction D2 (910). The second structural element (216, 616) exerts a fourth rotational force in the first rotational direction R1 in response to the third rotational force provided by the first structural element in the second rotational direction R2 (912).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touchpad assembly, comprising:
   an actuator device that provides motion in a first direction;
   a first structural element coupled to the actuator device;
   a second structural element coupled to the first structural element;
   wherein the first structural element, in response to the motion in the first direction provided by the actuator device, exerts a first rotational force in a first rotational direction,
   wherein the second structural element, in response to the first rotational force by the first structural element, exerts a second rotational force in a second rotational direction opposite to the first rotational direction,
   wherein the first rotational force and the second rotational force provide a rotational vibration of the touchpad assembly.

2. The touchpad assembly of claim 1, wherein the actuator device provides motion in a second direction opposite to the first direction,
   wherein the first structural element, in response to the motion in the second direction provided by the actuator device, exerts a third rotational force in the second rotational direction,
   wherein the second structural element, in response to the third rotational force by the first structural element, exerts a fourth rotational force in the first rotational direction.

3. The touchpad assembly of claim 2, wherein the first rotational force, the second rotational force, the third rotational force, and the fourth rotational force provide the rotational vibration of the touchpad assembly.

4. The touchpad assembly of claim 1, wherein the first structural element includes:
   a body structure;
   a first extension member protruding from the body structure defining a first gap between the first extension member and the body structure; and
   a second extension member protruding from the body structure defining a second gap between the second extension member and the body structure.

5. The touchpad assembly of claim 4, wherein the second structural element includes:
   a perimeter structure;
   a first extension member protruding from the perimeter structure and positioned within the first gap;
   a second extension member protruding from the perimeter structure and positioned within the second gap.

6. The touchpad assembly of claim 5, wherein an end of the first extension member of the second structural element is coupled to the first structural element at a first connecting portion between the body structure and the first extension member of the first structural element, and wherein an end of the second extension member of the second structural element is coupled to the first structural at a second connecting portion between the body structure and the second extension member of the first structural element.

7. The touchpad assembly of claim 5, wherein the actuator is coupled to the first structural element outside of an inner perimeter surface of the perimeter structure of the second structural element.

8. The touchpad assembly of claim 1, wherein the actuator device is a linear resonant actuator.

9. The touchpad assembly of claim 1, wherein the actuator device is a piezo actuator.

10. The touchpad assembly of claim 1, wherein the first structural element is positioned between the second structural element and a printed circuit board (PCB).

11. The touchpad assembly of claim 1, further comprising dampening material positioned between the first structural element and the second structural element.

12. A touchpad assembly, comprising:
   an actuator device that provides motion in a first direction;
   a structural body, comprising:
      a first structural element coupled to the actuator device;
      a second structural element coupled to the first structural element;
      wherein the first structural element, in response to the motion in the first direction provided by the actuator device, exerts a first rotational force in a first rotational direction,
      wherein the second structural element, in response to the first rotational force by the first structural element, exerts a second rotational force in a second rotational direction opposite to the first rotational direction,
      wherein the first structural element and the second structural element form the structural body as a contiguous body,
      wherein the first rotational force and the second rotational force provide a rotational vibration of the touchpad assembly.

13. The touchpad assembly of claim 12, wherein the actuator device provides motion in a second direction opposite to the first direction,
   wherein the first structural element, in response to the motion in the second direction provided by the actuator device, exerts a third rotational force in the second rotational direction,
   wherein the second structural element, in response to the third rotational force by the first structural element, exerts a fourth rotational force in the first rotational direction.

14. The touchpad assembly of claim 13, wherein the first rotational force, the second rotational force, the third rotational force, and the fourth rotational force provide the rotational vibration of the touchpad assembly.

15. The touchpad assembly of claim 12, wherein the first structural element includes:
   a body structure;
   a first extension member protruding from the body structure defining a first gap between the first extension member and the body structure; and
   a second extension member protruding from the body structure defining a second gap between the second extension member and the body structure.

16. The touchpad assembly of claim 15, wherein the second structural element includes:
   a perimeter structure;
   a first extension member protruding from the perimeter structure and positioned within the first gap;
   a second extension member protruding from the perimeter structure and positioned within the second gap.

17. The touchpad assembly of claim 16, wherein an end of the first extension member of the second structural element is connected to the first structural element at a first connecting portion between the body structure and the first extension member of the first structural element, and wherein an end of the second extension member of the second structural element is connected to the first structural at a second connecting portion between the body structure and the second extension member of the first structural element.

18. The touchpad assembly of claim 16, wherein the actuator device is coupled to the first structural element between the perimeter structure of the second structural element and the body structure of the first structural element.

19. The touchpad assembly of claim 13, wherein the actuator device is a linear resonant actuator.

20. The touchpad assembly of claim 13, wherein the actuator device is a piezo actuator.

* * * * *